United States Patent
Tsutsumi et al.

(10) Patent No.: US 7,315,772 B2
(45) Date of Patent: Jan. 1, 2008

(54) MOTION CONTROL APPARATUS AND METHOD FOR AUTOMOTIVE VEHICLE

(75) Inventors: Junji Tsutsumi, Kanagawa (JP); Hideki Sudou, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 209 days.

(21) Appl. No.: 10/768,689

(22) Filed: Feb. 2, 2004

(65) Prior Publication Data

US 2004/0158375 A1 Aug. 12, 2004

(30) Foreign Application Priority Data

Feb. 7, 2003 (JP) ............................. 2003-031556

(51) Int. Cl.
*B60T 8/32* (2006.01)
*B62D 5/04* (2006.01)

(52) U.S. Cl. ........................... 701/41; 180/142; 280/91

(58) Field of Classification Search ................. 701/44, 701/41, 36, 70, 45, 42, 72; 180/422, 443, 180/410, 412; 280/91, 142; 303/152, 146, 303/113.2; 123/480

See application file for complete search history.

(56) References Cited

U.S. PATENT DOCUMENTS

| | | | | |
|---|---|---|---|---|
| 4,836,319 A * | 6/1989 | Haseda et al. | ............... | 180/412 |
| 5,343,393 A * | 8/1994 | Hirano et al. | .................. | 701/41 |
| 5,521,820 A * | 5/1996 | Wakamatsu et al. | .......... | 701/42 |
| 5,957,987 A * | 9/1999 | Sudo et al. | .................... | 701/41 |
| 6,175,799 B1 | 1/2001 | Tsutsumi et al. | | |
| 6,615,124 B1 * | 9/2003 | Adachi | ........................ | 701/70 |
| 2004/0088093 A1 * | 5/2004 | Yao et al. | ...................... | 701/44 |

FOREIGN PATENT DOCUMENTS

JP 10-7010 A 1/1998

* cited by examiner

*Primary Examiner*—Jack Keith
*Assistant Examiner*—Ronnie Mancho
(74) *Attorney, Agent, or Firm*—Foley & Lardner LLP

(57) ABSTRACT

In vehicular motion control apparatus and method, a vehicle speed variation rate limiter is provided to place a vehicle speed variation rate limitation on a detection value (V) of a vehicle speed and varying a vehicle speed variation rate limiter value in accordance with the detection value (θ) of the vehicular steering angle, at the vehicular motion target value calculation, using an output of the vehicular speed variation rate limiter for a map reference vehicle speed (Vmap) and, at the control command value calculation, using the output of the vehicular speed variation rate limiter to the detection value of the vehicle speed for a control command value calculation purpose.

20 Claims, 9 Drawing Sheets

VEHICLE SPEED V

STEERING ANGLE θ

TARGET YAW RATE ψ'ₘ

TARGET YAW ACCELERATION ψ''ₘ

REAR ROAD WHEEL STEERING ANGLE COMMAND VALUE δ_RM

LATERAL ACCELERATION dVy

FIG.11A VEHICLE SPEED V
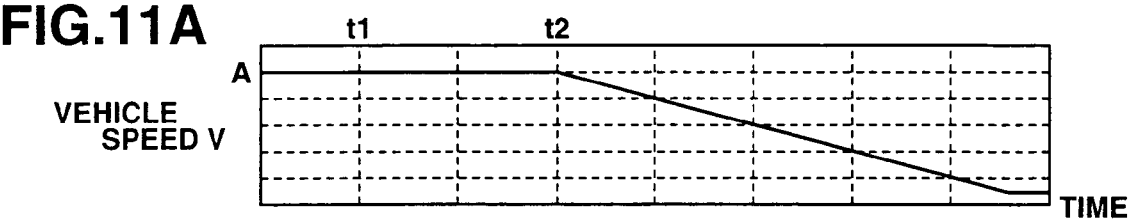
FIG.11B STEERING ANGLE θ
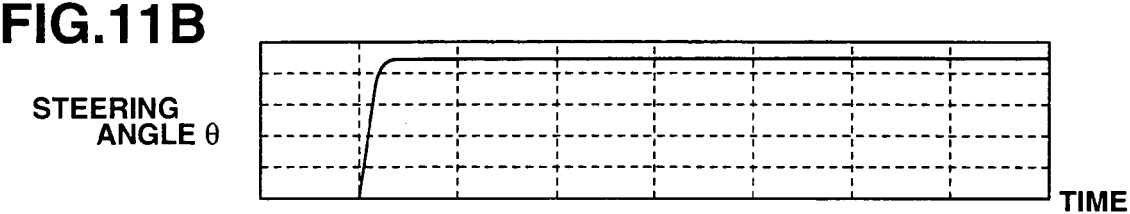
FIG.11C TARGET YAW RATE $\psi'_M$
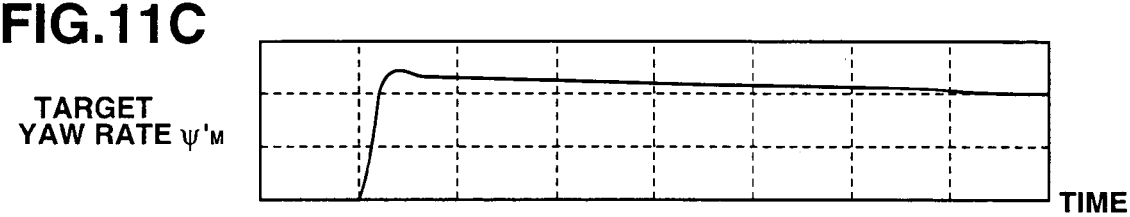
FIG.11D TARGET YAW ACCELERATION $\psi''_M$
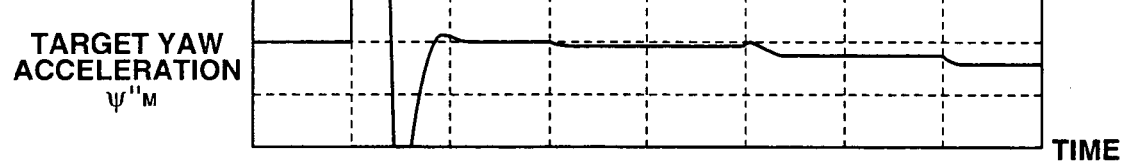
FIG.11E REAR ROAD WHEEL STEERING ANGLE COMMAND VALUE $\delta_{RM}$
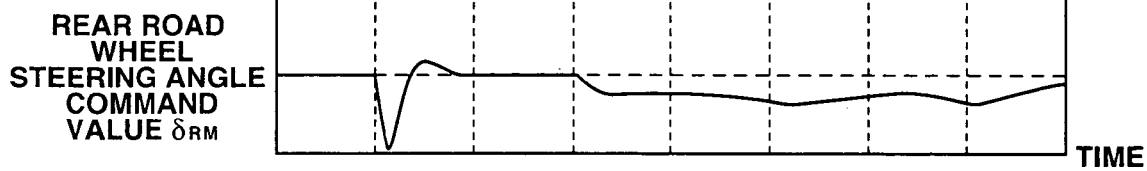
FIG.11F LATERAL ACCELERATION $dV_y$
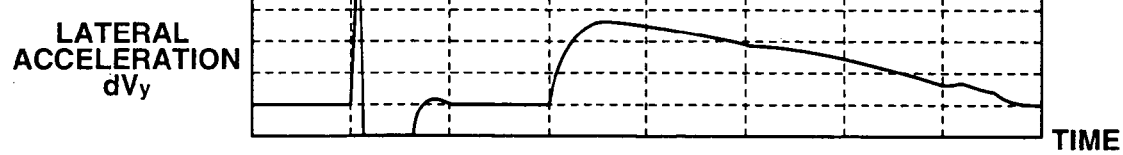

MOTION CONTROL APPARATUS AND METHOD FOR AUTOMOTIVE VEHICLE

BACKGROUND OF THE INVENTION

1. Field of the Invention

The present invention relates to motion control apparatus and method for an automotive vehicle which are capable of controlling a vehicular motion during a steering maneuver input on front road wheels.

2. Description of the Related Art

A Japanese Patent Application First Publication No. Heisei 10-007010 published on Jan. 13, 1998 (which corresponds to a U.S. Pat. No. 5,957,987 issued on Sep. 28, 1999) exemplifies a previously proposed vehicular motion control apparatus. In the above-identified Japanese Patent Application First Publication, a vehicular yaw rate and so on are controlled during a steering operation (maneuver) so that a vehicular stability during a steering wheel operation is maintained. Specifically, a target yaw rate for a response characteristic related to a plane motion of the vehicle on the basis of the steering angle and the vehicle speed to coincide with a predetermined response characteristic is calculated, a rear road wheel steering angular command value required to make the yaw rate developed on the vehicle coincident with its target value is calculated in accordance with a motion equation based on a vehicular specification value. Rear road wheel actual steering angles are controlled to follow a rear road wheel steering angle command value. Thus, this control results in a yaw motion in accordance with a target yaw rate.

The target yaw rate is calculated by setting a response characteristic of the target yaw rate with respect to a change in the steering angle as a first order or second order transfer function and presetting a vehicle speed dependent constant in accordance with a vehicle speed. Thus, a steering response characteristic of the yaw rate during a low speed run is maintained and a vehicular motion which is superior in a steering response characteristic and stability without giving a sense of incompatibility to a vehicle driver during a high speed run can be achieved.

SUMMARY OF THE INVENTION

However, in the above-described vehicular motion control apparatus, the vehicle speed dependent constants are stored as skip values (discrete values and not continuous values) as a map stored previously for each vehicle speed. In a case where the vehicle speed during the calculation of the target yaw rate is not coincident with a point on a map axle, a straight line (linear) interpolation is carried out on the basis of points mutually adjacent points on the map to calculate the corresponding vehicle speed dependent constant. Hence, an error due to the execution of the straight line (linear) interpolation gives an ill influence on the target yaw rate. Consequently, there is a high possibility of giving an ill influence on the rear road wheel steering angle. Hence, in a case where the vehicle speed is varied during the steering operation such as a turning braking, the rear road wheel steering angles provide motions other than a desired motion so that there is a possibility that the driver gives an unpleasant feeling (the sense of incompatibility).

It is, therefore, an object of the present invention to provide vehicular motion control apparatus and method which are capable of controlling stably a motion of the vehicle without giving the sense of incompatibility to the driver, even if the vehicle velocity (vehicle speed) is varied during the vehicular motion control in the vehicular motion control apparatus.

The above-described object can be achieved by providing a vehicular motion control apparatus, comprising: a steering angle detecting section that detects a vehicular steering angle; a vehicle speed detecting section that detects a vehicle speed; a vehicular motion control mechanism that is capable of controlling a vehicular motion; a state detecting section that detects a state of the vehicular motion control mechanism; a vehicular motion target value calculating section that calculates a target value of the vehicular motion for a response characteristic on a vehicular plane motion to be enabled to provide a predetermined response characteristic on the basis of detection values of the steering angle and the vehicle speed and vehicle speed dependent constants preset in a form of a map for each vehicle speed; a control command value calculating section that calculates a vehicular motion control mechanism command value required to achieve the target value of the vehicular motion; and a servo calculating section that provides a control signal for a rear road wheel steering actuator in such a manner that a detection value of the state of the vehicular motion control mechanism is made coincident with the motion control mechanism command value; and a vehicle speed variation rate limiter that places a limitation on a vehicle speed variation rate and varies in accordance with the detection value of the vehicular steering angle, the vehicular motion target value calculating section using an output of the vehicle speed variation rate limiter for a map reference vehicle speed and the control command value calculating section using the output of the vehicle speed variation rate limiter to the detection value of the vehicle speed for a control command value calculation.

The above-described object can also be achieved by providing a vehicular motion control method, comprising: detecting a vehicular steering angle; detecting a vehicle speed; providing a vehicular motion control mechanism which is capable of controlling a vehicular motion; detecting a state of the vehicular motion control mechanism; calculating a target value of the vehicular motion for a response characteristic on a vehicular plane motion to be enabled to provide a predetermined response characteristic on the basis of detection values of the steering angle and the vehicle speed and vehicle speed dependent constants preset in a form of a map for each vehicle speed; calculating a vehicular motion control mechanism command value required to achieve the target value of the vehicular motion; and providing a control signal for a rear road wheel steering actuator in such a manner that a detection value of the state of the vehicular motion control mechanism is made coincident with the motion control mechanism command value; and providing a vehicle speed variation rate limiter to place a vehicle speed variation rate limitation on the detection value of the vehicle speed and varying the vehicle speed variation rate limitation in accordance with the detection value of the vehicular steering angle, at the vehicular motion target value calculation, using an output of the vehicle speed variation rate limiter for a map reference vehicle speed and, at the control command value calculation, using the output of the vehicle speed variation rate limiter to the detection value of the vehicle speed for a control command value calculation.

This summary of the invention does not necessarily describe all necessary features so that the invention may also be a sub-combination of these described features.

BRIEF DESCRIPTION OF THE DRAWINGS

FIGS. 11A, 11B, 11C, 11D, 11E, and 11F are integrally a timing chart of each control signal in a case where the vehicle speed limitation is placed.

DETAILED DESCRIPTION OF THE PREFERRED EMBODIMENTS

Reference will hereinafter be made to the drawings in order to facilitate a better understanding of the present invention. Hereinafter, preferred embodiments of a vehicular motion control apparatus according to the present invention will be described. However, the present invention is not limited to these embodiments.

First Embodiment

Figure 1:
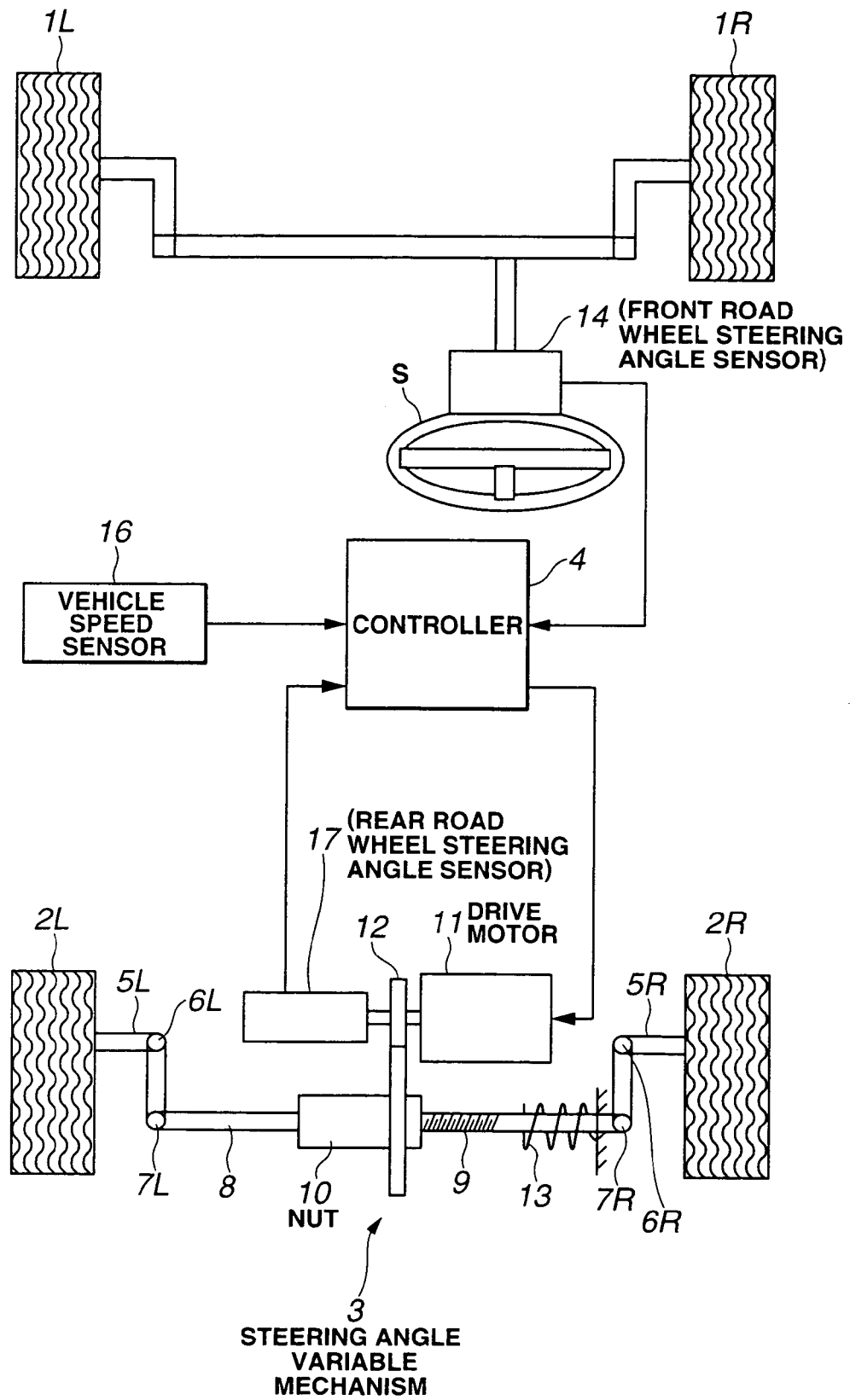
FIG. 1 is a rough configuration view of an automotive vehicle to which a first preferred embodiment of a vehicular motion control apparatus is applicable.

FIG. 1 is a whole system configuration view representing a basic structure of a vehicular motion control apparatus in a first preferred embodiment according to the present invention.

A steering angle variable mechanism 3 includes: knuckle arms 5L and 5R attached onto left and right rear road wheels 2L and 2R; king pin axles 6L and 6R; ball joints 7L and 7R; a tie rod 8 connected to knuckle arms 5L and 5R and formed about ball joints 7L and 7R; a slip screw 9 formed on tie rod 8; and a nut 10 having outer teeth on an outer peripheral surface thereof, the slip screw 9 being formed on tie rod via king pin axles 6L, 6R and ball joints 7L and 7R between knuckle arms 5L and 5R; and outer teeth 12 attached on a revolving axle of a driving motor 11 constituted by a stepping motor and which is meshed with the outer teeth of nut 10. A revolution drive of driving motor 11 moves tie rod 8 in the leftward-and-rearward direction to steer rear left-and-right wheels 2L and 2R. It is noted that a reference numeral 13 denotes a return spring for tie rod 8 to be returned to a neutral position. It is also noted that, in FIG. 1, a reference symbol S denotes a steering wheel of a vehicular steering system, 1L and 1R denotes front left and right road wheels, and 2L and 2R denote rear left and right road wheels.

Figure 2:
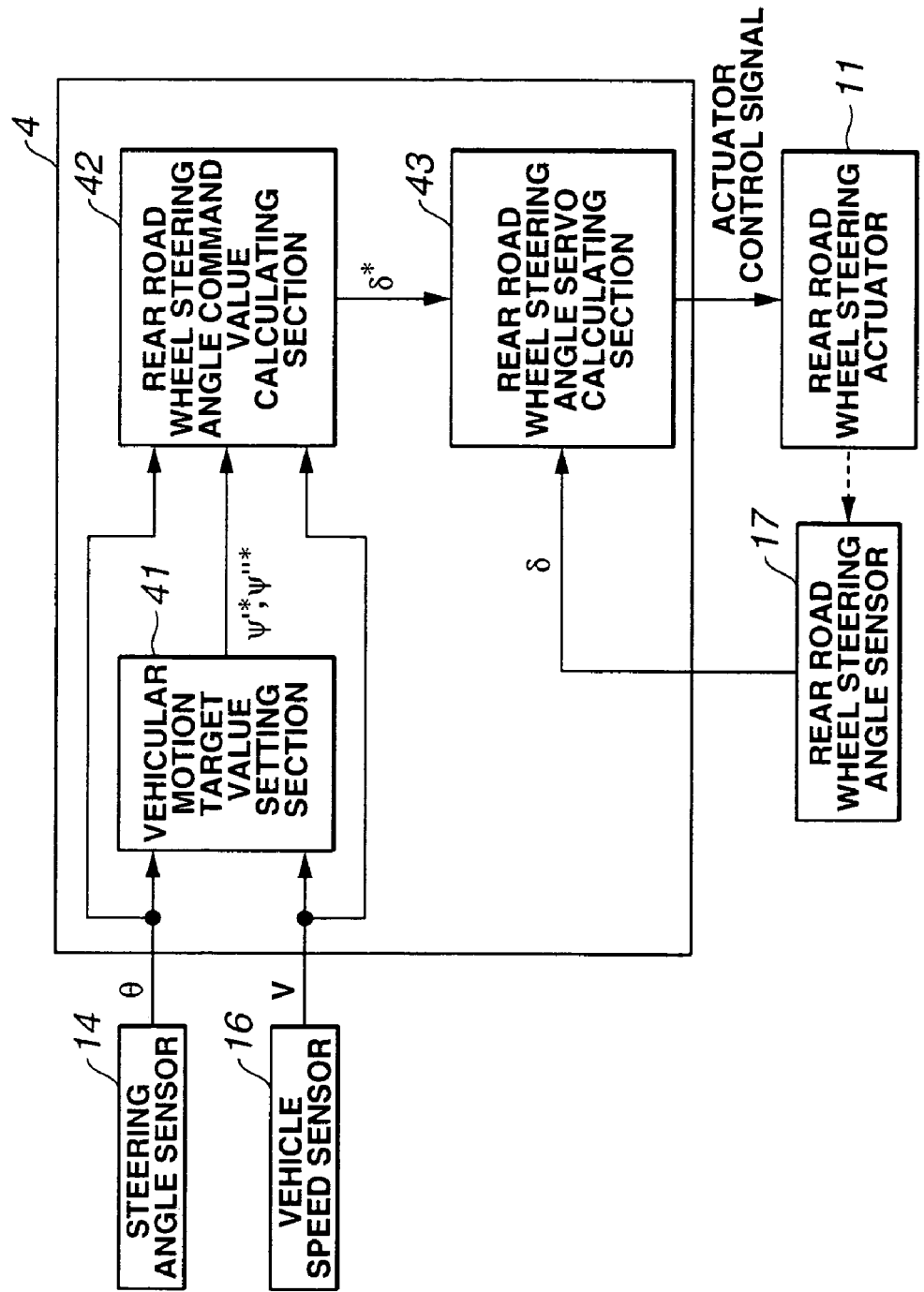
FIG. 2 is a schematic view of a steering angle controller (controller) of the vehicular motion control apparatus in the first embodiment shown in FIG. 1.

FIG. 2 shows a functional block diagram of controller 4 shown in FIG. 1. As shown in FIG. 2, a controller 4 includes a vehicular motion target value setting section (vehicular target value calculating section) 41 which receives a front road wheel steering angle detection value θ from a front road wheel steering angle sensor 14 and a vehicle speed detection value V from vehicle speed sensor 16 and calculates a target yaw rate $\Psi'^*$ as a vehicular motion target value and a target yaw angular acceleration $\Psi''^*$. In addition, a target rear road wheel steering angle calculating section 42 which calculates a target rear road wheel steering angle δ* on the basis of target yaw rate $\Psi'^*$ and target yaw angular acceleration $\Psi''^*$ derived from vehicular motion target value setting section 41, detection value of the front steering angle θ and vehicle speed detection value V is functionally provided in controller 4. Controller 4 includes a microcomputer having a CPU (Central Processing Unit), a ROM (Read Only Memory), a RAM (Random Access Memory), an Input Port, an Output Port, a common bus, and so forth. Furthermore, controller 4 includes a rear road wheel steering angle servo amplifier (amplifying or calculating) section 43 which supplies a control signal to a rear road wheel steering angle steering actuator 11 (namely, drive motor shown in FIG. 1), the control signal being such that rear road wheel steering angle detection signal δ is made coincident with target rear road wheel steering angle δ*.

Vehicle speed motion target value setting section 41 calculates a target yaw rate (yaw velocity) $\Psi'^*$ as a vehicular motion target value with respect to a front road wheel angle detection value on the basis of a transfer function between front road wheel steering angle detection value θ and target yaw rate $\Psi'^*$ shown in the following equation (1).

$$\phi'^*/\theta = G\Psi' \cdot \{\omega_n^2(n_1 S+1)\}/(S^2+2\zeta\omega_n S+\omega_n^2) \quad (1),$$

wherein S denotes s Laplace transform operator, $G\Psi'$, $\omega n$, $n_1$, and $\zeta$ denote vehicle speed dependent constants, namely, $G\Psi'$ denotes a yaw rate gain, $\omega_n$ denotes a natural (or specific) angular frequency, $n_1$ denotes a zero point corresponding (equivalent) value, and $\zeta$ denotes a damping coefficient. These vehicle speed dependent constants are set on the basis of a control map representing a correspondent relationship between a preset vehicle speed and each of the vehicle speed dependent constants.

Figure 5:
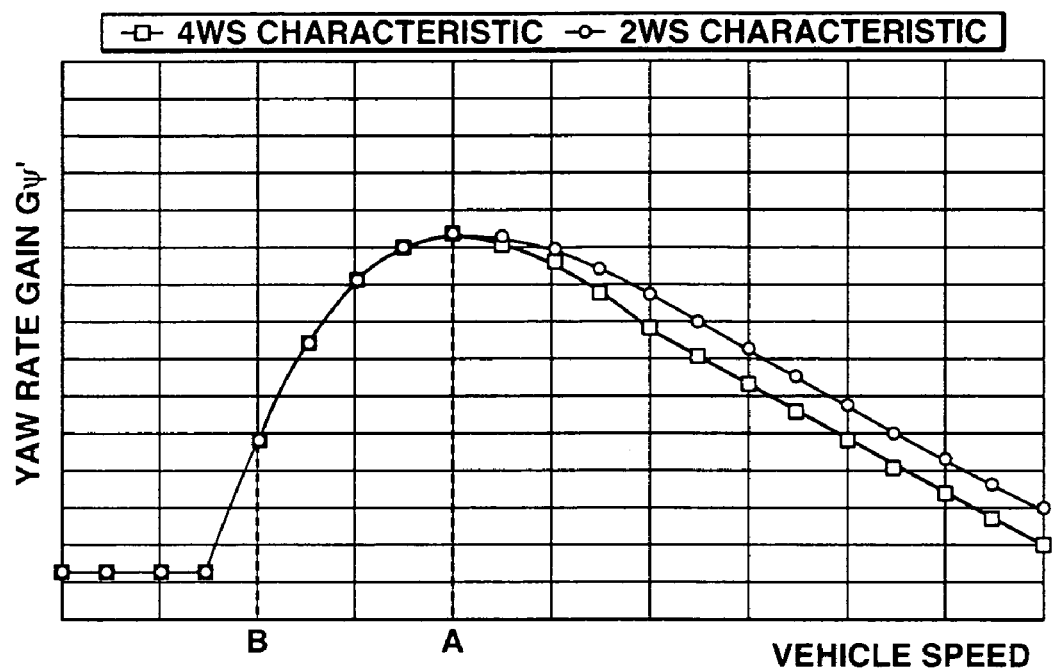
FIG. 5 is a vehicle speed-yaw rate gain map used in a steering control of the vehicular motion control apparatus in the first embodiment shown in FIG. 2.

FIG. 5 typically shows a map representing the relationship between vehicle speed V and yaw rate gain $G\Psi'$. These vehicle speed dependent constants are such that yaw rate gain $G\Psi'$ identifies a steady state gain, namely, a steady state yaw rate with respect to the steering angle θ, specifies a steady state yaw rate with respect to a steering angle, specific angular frequency ωn specifies its vibration frequency, a zero-point equivalent value $n_1$ denotes a speed of a rise in a yaw rate with respect to a change in the steering angle, namely, specifies a rise characteristic of yaw rate, and damping coefficient ζ specifies a speed of a convergence, namely, specifies a convergence characteristic of the yaw rate. Hence, the whole speed dependent constants are set to be enabled to provide desired response characteristics and the response characteristic of target yaw rate $\Psi'^*$ calculated on the basis of the preset vehicle speed dependent constants using equation (1) provide a desired response characteristic.

Hence, by setting vehicle speed dependent constants in accordance with the vehicle speed, the response characteristic on target yaw rate $\Psi'^*$' provides response characteristic different in dependence on the vehicle speed. In addition, by individually and independently modifying yaw rate gain $G\Psi'$, specific angular frequency $\omega n$, zero-point equivalent value $n_1$, and damping coefficient $\zeta$, the response characteristic which is different only in steady state gain or vibration frequency only can be obtained.

Figure 3:
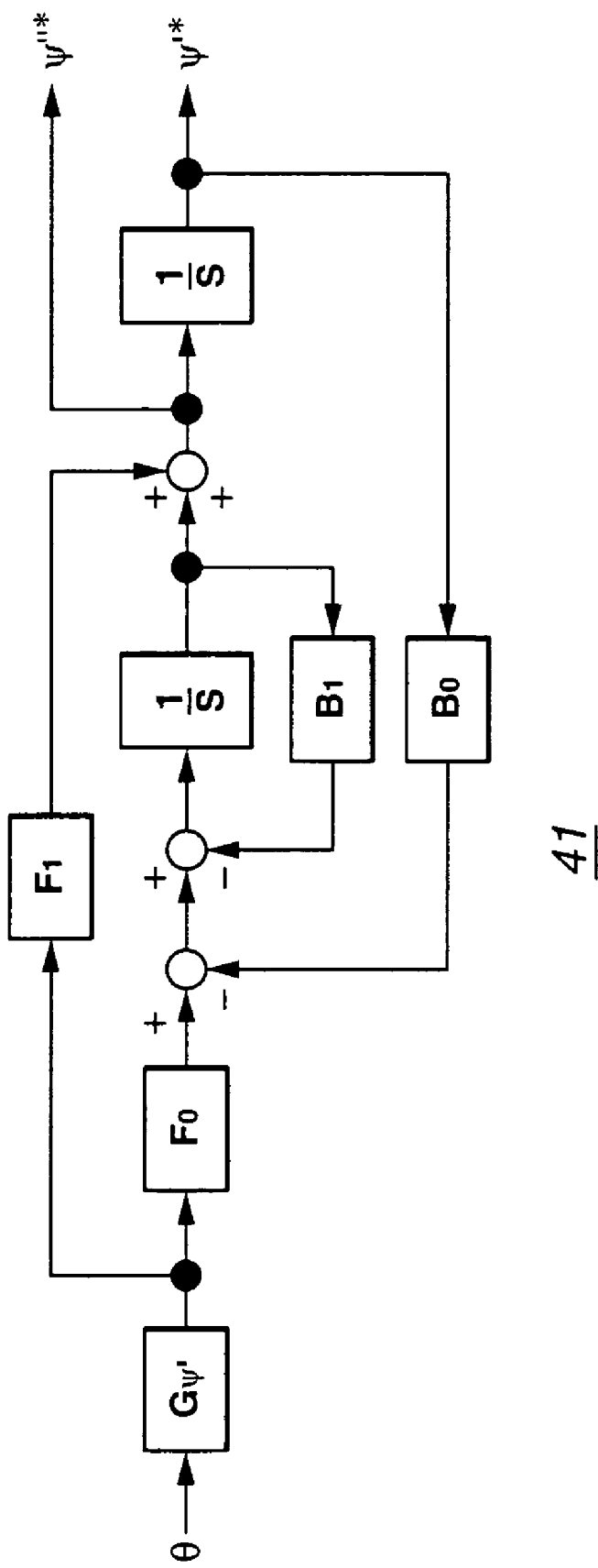
FIG. 3 is a circuit block diagram representing a structure of a target value generating section in the vehicular motion control apparatus in the first embodiment shown in Figure.

FIG. 3 shows a block diagram representing a structure of vehicular motion target value setting section 41. In rear road wheel steering angle command value setting (calculating) section 42, target yaw angular acceleration $\Psi''^*$ is needed. Hence, after target yaw angular acceleration $\Psi''^*$ is calculated, this is integrated to calculate a target yaw rate $\Psi'^*$. It is noted that $B_0$, $B_1$, $F_0$, and $F_1$ in FIG. 3 are values calculated on the basis of the following equations:

$$B_0 = \omega_n^2, \ B_1 = 2\zeta\omega_n, \ F_0 = n_1\omega_n^2, \text{ and } F_1 = \omega_n^2 - B_1 \cdot F_1.$$

In rear road wheel steering command value calculating section 42, a reverse calculation of two degrees of freedom vehicular motion equations causes the rear road wheel steering angle $\delta$ which can make target yaw rate $\Psi'^*$ coincident with actual yaw rate $\Psi'$ to be calculated so that this provides target rear road wheel steering angle $\delta^*$.

$$\delta^* = \beta_R + (V_y - L_R \cdot \Psi'^*)/V \tag{2}$$

$\beta_R = C_R/K_R$
$C_R = (2L_F \cdot C_F - Iz \cdot \Psi''^*/2)/L_R$
$C_F = eK_F \cdot \beta_F$
$\beta_F = \theta/N - (V_y + L_F \cdot \Psi'^*)/V$
$V_y = \int V_y' dt$
$V'_y = (2C_F + 2C_R)/M - V \cdot \Psi'^*$, wherein $V_y$ denotes a vehicular lateral velocity, $V'_y = dV_y$ (described later), $\beta_F$ denotes a front road wheel side slip angle, $\beta_R$ denotes a rear road wheel side slip angle, $C_F$ denotes a cornering force of front road wheels, $C_R$ denotes a cornering force of rear road wheels, $K_R$ denotes a cornering power of a vehicular rear road wheel, $eK_F$ denotes an equivalent cornering power of a vehicular front road wheel (although the front road wheel cornering power, a value with a reduction of the cornering power with respect to the steering angle due to an influence of steering rigidity), $I_z$ denotes a yaw inertia moment of the vehicle, M denotes a vehicular weight, and N denotes a steering gear ratio.

Rear road wheel steering angle servo amplifying section 43 carries out a servo calculation using a Robust Model Matching Control on the basis of a deviation between a rear road wheel steering angle command value $\delta^*$ and a rear road wheel steering angle detection signal $\delta$ of rear road wheel steering angle sensor (rear road wheel steering angle detecting section) 17 and the control signal is outputted to rear road wheel steering actuator 11 constituted by the drive motor. The robust model matching technique is exemplified by a U.S. Pat. No. 6,175,799 issued on Jan. 16, 2001. Rear road wheel steering angle servo amplifying section 43, for example, includes a robust compensator which serves as an external disturbance estimator and a model matching compensator which makes whole response characteristic of the rear road wheel steering angle servo calculating section 43 equal to a response characteristic of a normal (standard) model, in order for rear road wheel steering angle servo calculating section 43 to provide a robust control system to such a variation in the rear road wheel steering angle value ($\delta$), (the disclosure of the U.S. Patent described above is herein incorporated by reference).

Figure 4:
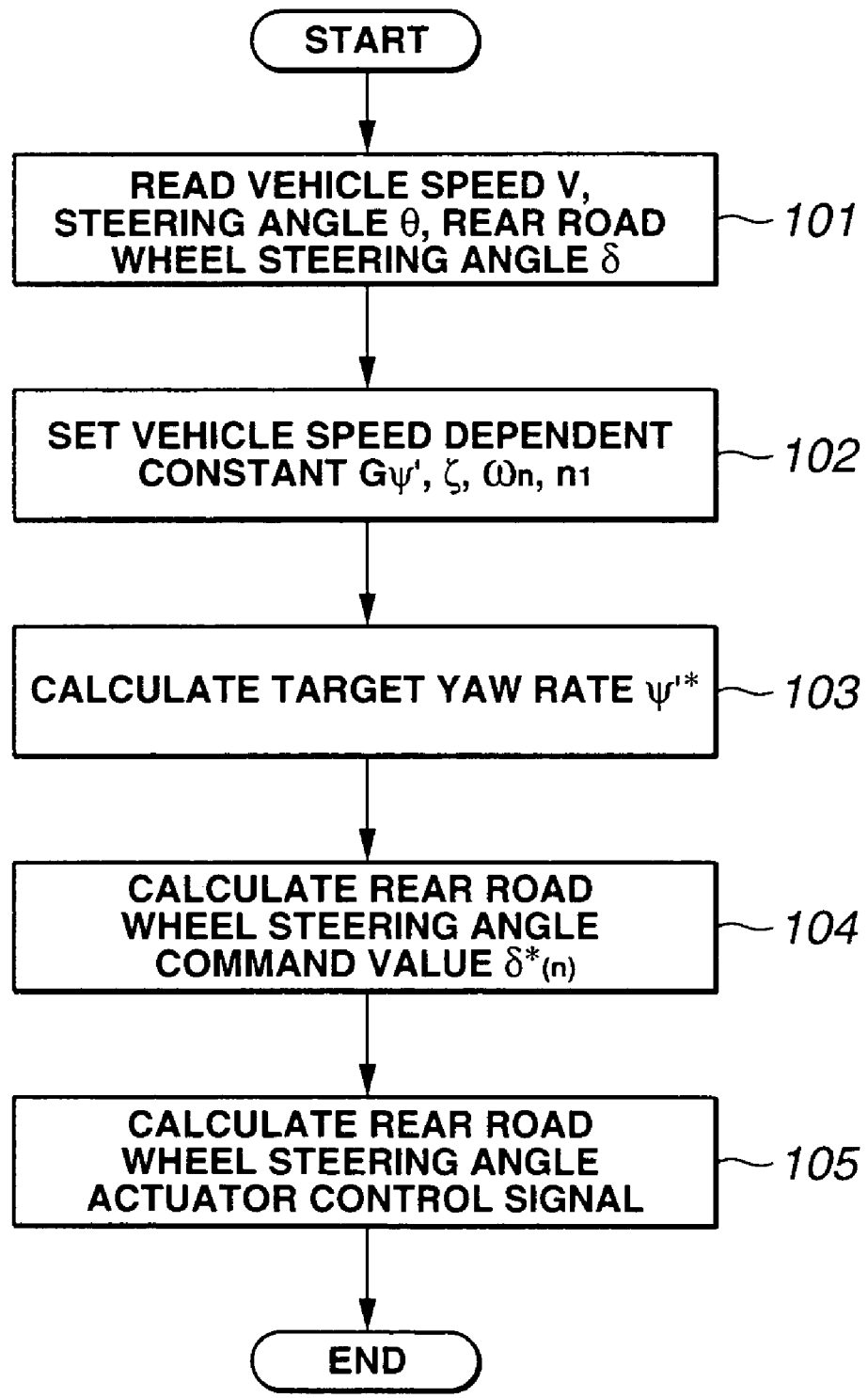
FIG. 4 is an operational flowchart representing a steering control procedure executed by the controller shown in FIG. 2.

Next, an operation of the vehicular motion control apparatus in the first embodiment according to the present invention will be described below. FIG. 4 shows an operational flowchart representing a procedure in accordance with which (vehicular motion) controller 4 is executed. It is noted that this procedure shown in FIG. 4 is executed for each predetermined control period (for example, 10 milliseconds).

At a step 101, controller 4 reads steering angle detection value $\theta$ from front road wheel steering angle sensor (a vehicular steering angle detecting section) 14, vehicle speed detection value V from vehicle speed sensor (vehicle speed detecting section) 16, and a rear road wheel steering angle detection signal $\delta$ from rear road wheel steering angle sensor 17.

At a step 102, controller 4 refers to control maps each representing a correspondent relationship between a preset vehicle speed and corresponding one of the vehicle speed dependent constants and sets yaw rate gain $G\Psi'$, damping coefficient $\zeta$, specific angular frequency $\omega_n$, and a zero-point equivalent (corresponding) value $n_1$. As appreciated from FIG. 5, since the values set for each predetermined value is provided, when the detected vehicle speed is rested on a point except a predetermined vehicle speed on a map, a straight line (linear) interpolation derives a value between the maps so that each vehicle speed dependent constant is set.

A map reference vehicle speed Vmap in which a limitation is placed on a variation rate of vehicle speed V without use of the detection value directly from vehicle speed sensor 2 to refer to each of the control maps. The detailed description thereof will be described later.

Then, at a step 103, controller 4 calculates target yaw rate $\Psi'^*$ on the basis of set vehicle speed dependent constants, equation (1), and steering angle detection value $\theta$ from the front road wheel steering angle sensor 14.

At a step 104, controller 4 calculates rear road wheel steering angle command value $\delta^*$ which enables the coincidence of calculated target yaw rate $\phi'^*$ with actual yaw rate $\phi'$. However, map reference vehicle speed Vmap is also used for the calculation of equation (2) described above. The details of map reference vehicle speed Vmap will be described later. In addition, if the vehicle speed is lower than a predetermined vehicle speed B whish represents a low vehicle speed, the rear road wheel steering angle command value correction processing to correct rear road wheel steering angle command value $\delta^*$ calculated at a previous control period is executed. The details of the processing will be described later.

At a step 105, controller 4 carries out a servo calculation using, for example, the robust model matching control on the basis of the deviation between rear road wheel steering angle command value $\delta^*$ and rear road wheel steering angle detection value $\delta$ and calculates the control signal to be outputted to rear road wheel steering actuator 3.

(Vehicle Speed Limiter Processing During Vehicle Speed Dependent Calculation)

Figure 6:
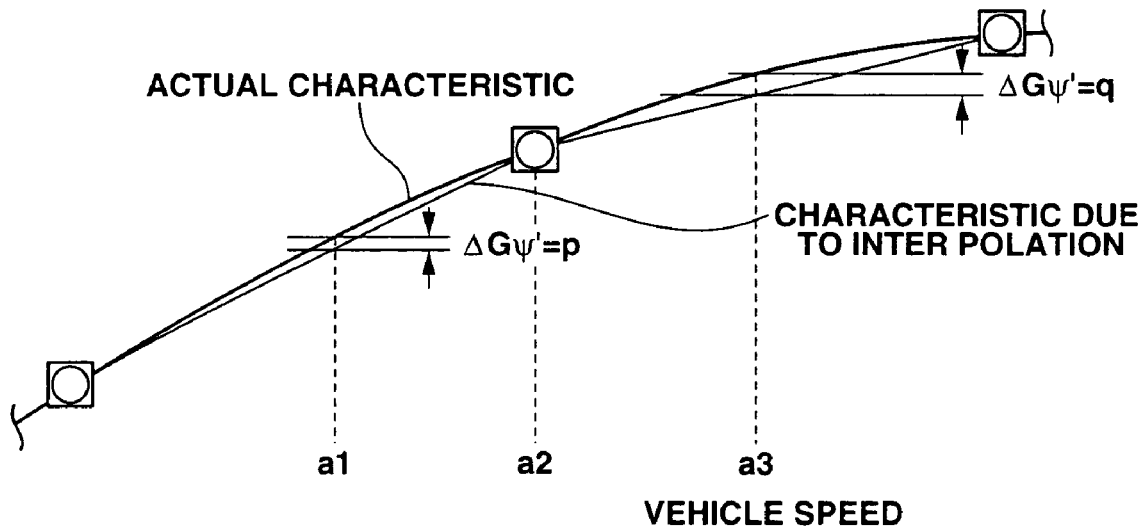
FIG. 6 is a partially expanded view of the vehicle speed-yaw rate gain map shown in FIG. 5.

Next, the detailed explanation of step 102 shown in FIG. 4 will herein be made. The linear (straight line) interpolation is used to develop an error when respective vehicle speed dependent constants are set. Consequently, there is a possibility that a sense of incompatibility is given to the driver. The explanation is made on this phenomenon. To simplify this phenomenon, vehicle speed dependent constants are supposed to be set to the same values as the vehicle speed dependent constants that 2WS (rear left and right rear road wheels 2L and 2R are not steered) vehicle has. In a region equal to or below vehicle speed A shown in FIG. 5, target yaw rate $\Psi'^*$ calculated on the basis of vehicle speed constants becomes equal to the yaw rate characteristic developed on 2WS (two wheel steering) vehicle. This target rear road wheel steering angle δ* calculated on the basis of target yaw rate Ψ'* should be zeroed at a low speed region denoted by point A in FIG. 5. However, the control map representing vehicle speed and one of vehicle speed dependent constants has a value for each predetermined vehicle speed. Hence, a value between each vehicle speed point is derived through the linear interpolation. As shown by a map expanded view of FIG. 6, a region in which, strictly, an actual characteristic is not coincident with 2WS characteristic is present. For example, a difference ΔGφ' in characteristic between actual 2WS characteristic and characteristic line by means of the linear interpolation indicates p when, for example, vehicle speed is at a speed of a1. Difference ΔGφ' at a time of vehicle speed of a2 indicates zero. In addition, difference ΔGφ' when vehicle speed is at a steed of a3 is q (>p). Therefore, as target yaw rate φ'* is different from the yaw rate characteristic developed on 2WS vehicle, rear road wheel steering angle command value δ* is calculated (except zero) having a certain value. This phenomenon gives the sense of incompatibility to the vehicle driver (even if the rear road wheel is developed, the influence is less since the rear road wheel steering angle is minute and gives a constant value). However, in a case where the vehicle speed is varied, the rear road wheel steering angle is varied (the error with respect to 2WS characteristics becomes large and/or small); this is varied due to a compensation for p→0→q or q→0→p) and, hence, there is a possibility that the sense of incompatibility is given to the driver).

Figure 7:
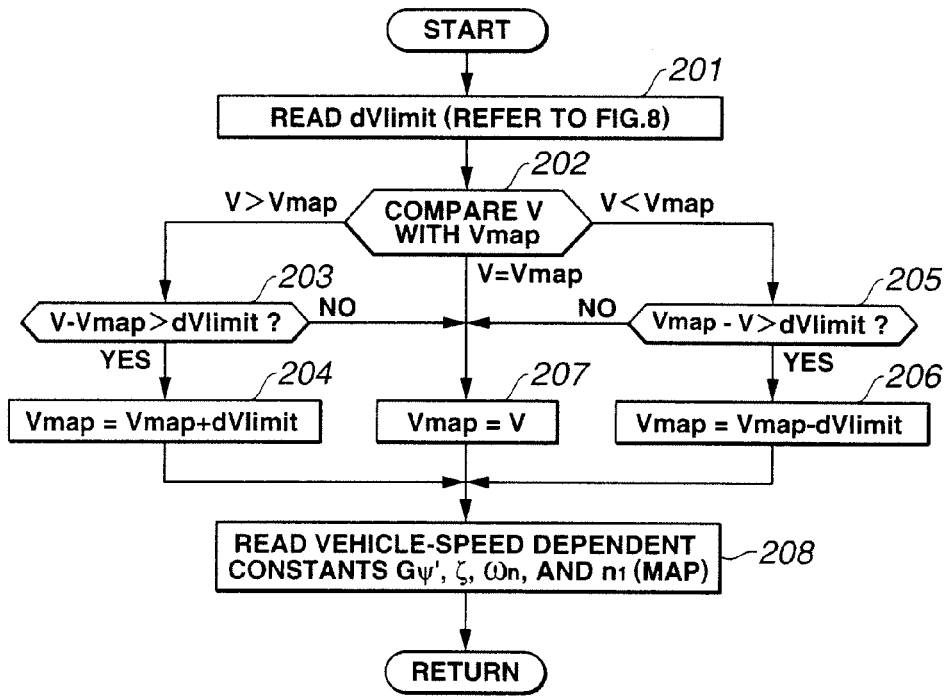
FIG. 7 is an operational flowchart representing a vehicle speed variation rate limit processing.
Figure 8:
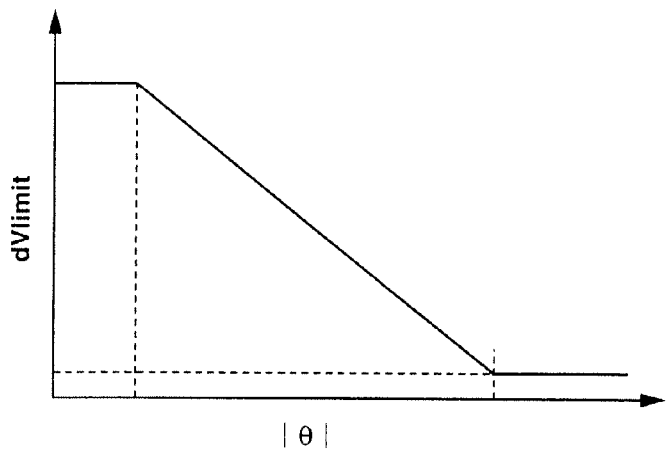
FIG. 8 is a map on the absolute value of a steering angle absolute value-vehicle speed variation limit value used in the motion control apparatus in the first embodiment.

Then, if the vehicle speed at a time of referring to each of the control maps, each map representing the correspondence between the detection value of the vehicle speed and the corresponding one of the vehicle speed dependent constants, is moderately varied, an influence caused by the above-described interpolation error is suppressed. Specifically, as shown by a vehicle speed variation rate limit map of a steering angle absolute value-to-vehicle speed variation rate in FIG. 8, a vehicle speed variation rate limiter is provided for the map reference vehicle speed and the control command value calculation vehicle speed. An output of the vehicle speed variation rate limiter is placed to vehicle speed detection value V may be vehicle speed dependent constant map reference vehicle speed Vmap. Hereinafter, a vehicle speed limiter process in the calculation of Vmap will be made on the basis of the flowchart of FIG. 7. That is to say, at a step 201, controller 4 sets a vehicle speed variation rate limit value dVlimit from an absolute value of steering angle |θ| as shown in FIG. 8. Since dVlimit denotes a value varied in accordance with absolute value |θ| of steering angle detection value, the value of limit value dVlimit is made smaller as absolute value of steering angle |θ| becomes larger and limit value of dVlimit becomes larger as absolute value of steering angle |θ| becomes smaller.

At a step 202, controller 4 compares the present value of vehicle speed V(n) presently detected and (a previous value of) map reference vehicle speed Vmap(n−1) previously calculated (before the control period of 10 milliseconds). If present vehicle speed detection value V(n) is larger than the previous value of the map reference vehicle speed (Vmap (n−1)) (namely, V>Vmap) at step 202 the routine goes to a step 203. At step 203, controller 4 compares a first difference of the present value of vehicle speed detection value V(n) from the previous value of map reference vehicle speed Vmap(n−1) (V(n)−Vmap(n−1), namely, V−Vmap) with vehicle speed variation rate limit value dVlimit. If V(n)−Vmap(n−1)>dVlimit (Yes) at step 203, the routine goes to a step 204. If V<Vmap (namely, V(n)<Vmap(n−1) at step 202, the routine goes to a step 205. If the present detection value of vehicle speed V(n) is made equal to the previous value of map reference vehicle speed Vmap (namely, Vmap(n−1)) at step 202 (V=Vmap), the routine goes to a step 207.

In details, after, at step 203, controller 4 compares the first difference of the present value of vehicle speed (n) from map reference vehicle speed Vmap(n−1) with vehicle speed variation rate limit value dVlimit and, if V(n)−Vmap (n−1)>dVlimit (Yes) at step 203, the routine goes to a step 204.

At step 204, controller 4 sets an addition value of Vmap (n−1) to vehicle speed variation rate limit value of dvlimit as the present value of Vmap(n). On the other hand, If V(n)<Vmap(n−1) at step 202 (namely, V<Vmap) at step 202, the routine goes to a step 205.

If a second difference of the present value of vehicle speed V(n) from the previous value of the map reference vehicle speed Vmap(n−1) is larger than limit value dVlimit, namely, if Vmap(n−1)−V(n)≦dvlimit (No at step 205), the routine goes to step 207. At step 206, controller 4 sets a value>dVlimit (V−Vmap>dVlimit) at step 205 (Yes), the routine goes to a step 206. If Vmap(n−1)−V(n)≦dvlimit (No at step 205), the routine goes to step 207. At step 206, controller 4 sets a value of subtraction of dVlimit from Vmap(n−1) as the present Vmap(n) (Vmap(n)=Vmap(n−1)−dVlimit). That is to say, if the variation in vehicle speed V becomes larger in a decrease direction, variation rate of map reference vehicle speed Vmap is limited by dVlimit. At step 207, the present detection value of the vehicle speed V(n) is set to Vmap(n) (Vmap=V). If the variation in vehicle speed is equal to or lower than the vehicle speed variation rate limit value of dVlimit at step 205(No), the routine goes to step 207. If V−Vmap≦dVlimit (namely, V(n)−Vmap(n−1)≦dVlimit) (No) at step 203, the routine goes to step 207. Then, at a step 208, controller 4 reads each vehicle speed dependent constant (yaw rate gain GΨ', damping coefficient ζ, specific angular frequency $\omega_n$, and zero-point equivalent value $n_1$) from each corresponding control map according to the set map reference vehicle speed Vmap(n) and the present process shown in FIG. 7 is ended.

That is to say, when the control map representing the correspondence between the vehicle speed and vehicle speed dependent constant is referred to, a variation in vehicle speed becomes moderate and an ill influence of the linear interpolation between the values of the respective points present on respective maps on the vehicular motion can be suppressed. In addition, vehicle velocity variation rate limit value dVlimit is varied in accordance with absolute value |θ| of the steering angle so that a situation such that actual vehicle speed V and map reference vehicle speed Vmap are, at any time, made different can be avoided. That is to say, if the steering angle is returned to an approximately neutral state so that the vehicle runs on a straight line road to give V=Vmap. Hence, during the subsequent steering operation, the control is carried out starting from a state in which each vehicle speed dependent constant tuned previously at the present vehicle speed is used.

(Rear Road Wheel Steering Angle Command Value Correction Processing)

Next, rear road wheel steering angle command value calculation and correction processing to be executed at step 104 shown in FIG. 4 will be described below.

That is to say, under a low vehicle speed region in which a control effect due to the 4WS steering is low, a tuning approaching to the characteristic of the two-wheel steering vehicle is carried out. Hence, rear road wheel steering angle command value δ* is calculated to provide approximately zero. However, as described above, such a case of error that rear road wheel steering angle command value δ* that naturally should have been zeroed has a certain value due to the error caused by the linear interpolation will occur. To avoid this, in the low vehicle speed region at which the tuning to approach to naturally the two-wheel steering (2WS) characteristic, rear road wheel steering angle command value δ* is forced to approach to zero so that the ill influence of the error due to the linear interpolation is suppressed.

Figure 9:
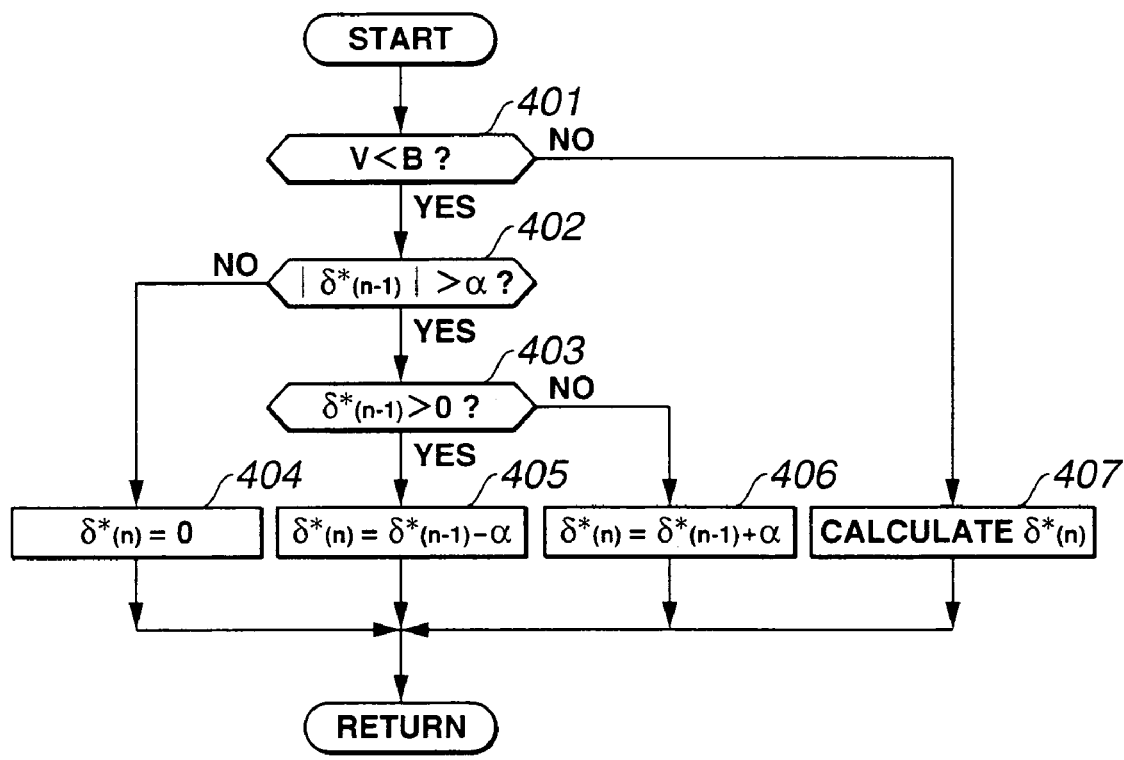
FIG. 9 is an operational flowchart representing a rear road wheel steering angle calculation processing and correction processing in the first embodiment.
Figure 10A:
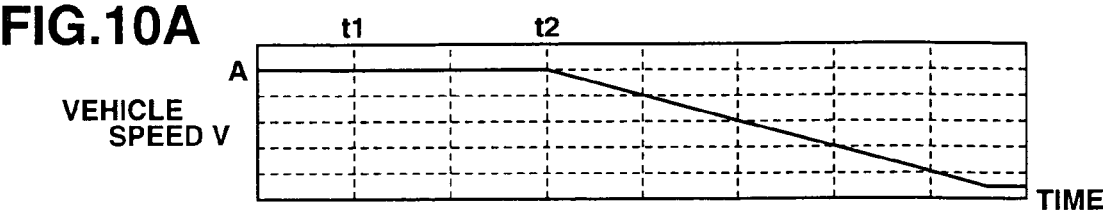
FIGS. 10A, 10B, 10C, 10D, 10E, and 10F are integrally a timing chart of each control signal in a case where no vehicle speed limitation is placed.
Figure 10B:
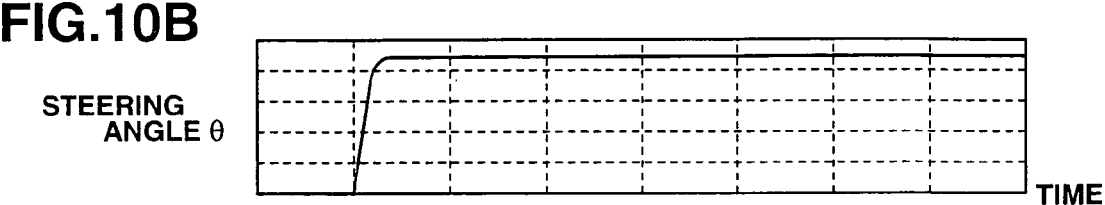
Figure 10C:
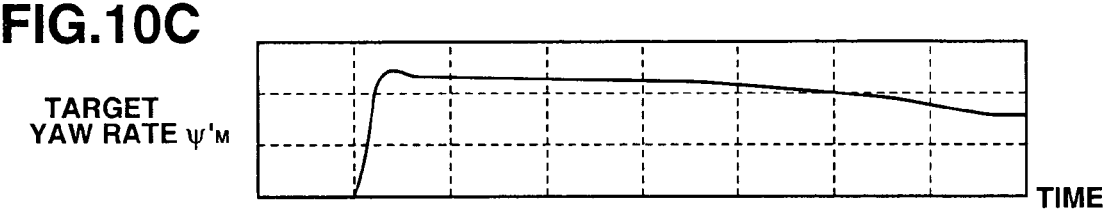
Figure 10D:
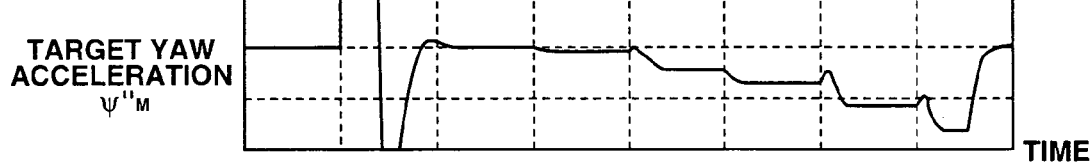
Figure 10E:
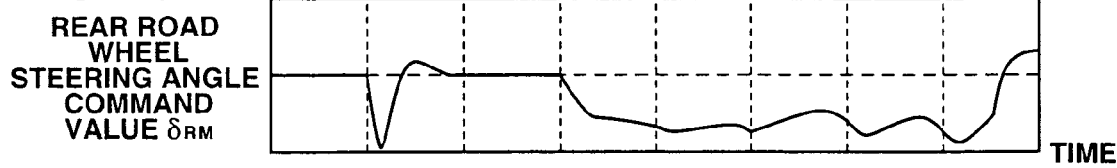
Figure 10F:
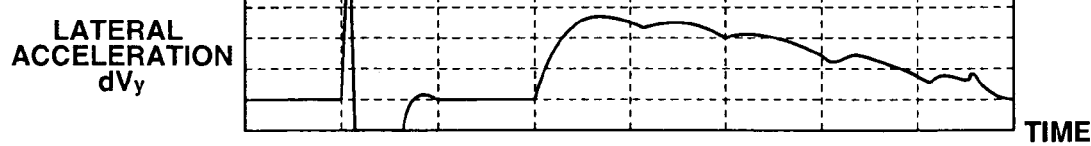

A rear road wheel steering command value correction processing will be described with reference to an operational flowchart shown in FIG. 9.

At a step 401, controller 4 determines whether vehicle speed detection value V of the vehicle speed falls below a predetermined vehicle speed B. If V<B at step 401 (Yes), the routine goes to a step 402. If V≧B at step 402 (No), the routine goes to a step 407. At a step 402, controller 4 determines whether |δ*(n−1)|>α, wherein an absolute value of previously calculated rear road wheel steering command value |δ*(n−1)| and α denotes a rear road wheel steering command value convergence quantity. Rear road wheel steering command value convergence quantity α is a value such that a speed for the absolute value of rear road wheel steering angle command value to approach to zero is set and is incremented or decremented to rear road wheel steering angle command value δ* for each control period. When absolute value of rear road wheel steering angle command value δ* becomes large, the routine goes from step 402 to a step 403. If |δ*(n−1)|≦α (No) at step 402, the routine goes to a step 404. At step 403, controller 4 determines if a sign of previously calculated rear road wheel steering angle command value δ* (n−1) is positive except 0 (>0). If δ* (n−1) is positive at step 403, the routine goes to a step 405. If not positive (No) at step 403, the routine goes to a step 406. At step 404, controller 4 sets the present rear road wheel steering angle command value δ*(n) to zero and the present routine shown in FIG. 9 is ended.

At step 405, controller 4 sets a subtraction value of rear road wheel steering angle command value convergence quantity α from previously calculated rear road wheel steering angle command value δ*(n−1) to present rear road wheel steering angle command value δ*(n) (δ*(n)=δ*(n−1)−α).

At step 406, controller 4 sets an addition value of rear road wheel steering angle command value convergence quantity α to previously calculated rear road wheel steering angle command value δ*(n−1) as the present rear road wheel steering angle command value δ*(n) (δ*(n)=δ*(n−1)+α). Then, the present routine of FIG. 9 is ended.

At step 407, controller 4 calculates ordinarily a rear road wheel steering angle command value δ* (refer to equation (2) described above) as the present rear road wheel steering angle command value δ*(n). Then, the present routine in FIG. 9 is ended.

As described above, it is possible to set accurately rear road wheel steering angle command value δ* to zero under a low vehicle speed region (lower than predetermined vehicle speed B). It becomes possible to eliminate the influence of the error caused by the linear interpolation when each vehicle speed dependent constant is set. A desired characteristic can, thus, be obtained. In addition, since rear road wheel steering angle command value convergence quantity α is set and a moderate convergence of rear road wheel steering angle command value δ* into zero can prevent such a phenomenon that the rear road wheel steering angle becomes abruptly zeroed and that the sense of incompatibility is given to the vehicle driver.

(Simulation)

FIGS. 10A through 10F show simulation results indicating the respective control signals and the vehicular motion in a case where vehicle speed variation rate limitation is not placed (with no vehicle speed variation rate limiter) for the detection value of the vehicle speed V to directly become the map reference vehicle speed Vmap. In addition, FIGS. 11A through 11F show each control signal and vehicular motion when the vehicle speed variation rate limitation is placed (with the vehicle speed variation rate limiter provided) for each speed dependent constant.

When the vehicle was decelerated from a point A of vehicle speed, a steering operation of 45° was carried out at a time point of t1 and a deceleration of about 0.28 G was carried out at a time point of t2. In addition, yaw rate gain GΨ' as one of vehicle speed dependent constants indicated the characteristics shown in FIG. 5, specific angular frequency ωn, zero-point equivalent value $n_1$, and damping constant ζ indicated the approximately same characteristics as 2WS in a range below vehicle speed A. In a case where, as appreciated from FIGS. 10A through 10F, the limitation on the vehicle speed variation rate is not placed, a variation of target yaw angular acceleration Ψ"* was large and rear road wheel steering angle command value δ* was varied.

On the other hand, in the case of the present invention, namely, in the case where the limitation on the vehicle speed variation rate was placed, the variation of each control signal was suppressed. Consequently, as shown in FIGS. 11A through 11F, a difference in the variation in the lateral acceleration $dV_y$ developed on the vehicle appeared. In the case of the present invention, it will be appreciated that the influence of each control signal given to the driver was suppressed. It is noted that a subscript M of each control signal shown in FIGS. 10A through 11F denotes the simulation result.

Other Embodiments

As described above, the vehicular motion control apparatus according to the present invention is not limited to the first embodiment described above. For example, the present invention is applicable to a vehicle in which a front road wheel steering angle providing section is mounted to provide the front road wheels with an auxiliary steering angle. Furthermore, the present invention is applicable to a vehicle in which a braking control section which is capable of controlling the vehicular yaw rate using a brake pressure difference between the left and right brake wheels. If the vehicle speed variation rate limiter is applied to each of the vehicles described above, a control target value (for example, target yaw rate, target lateral speed, or so on) is not varied quickly or abruptly. A further stable vehicular motion control can be achieved.

It is noted that front road wheel steering angle sensor 14 corresponds to a steering angle detecting section, rear road wheel steering angle sensor 17 corresponds to a state detecting section in a broad sense of term, drive motor 11 corresponds to a rear road wheel steering actuator in a broad sense of term, steering angle variable mechanism 3 corresponds to a vehicular motion control mechanism, a rear road wheel steering angle providing section, and vehicular motion controlling means, in a broad sense of term, vehicular target value setting section 41 corresponds to a vehicular motion target value calculating section (means), in a broad sense of term, rear road wheel steering angle command value calculating section 42 corresponds to a control command value calculating section (means), in a broad sense of term, and rear road wheel steering angle servo calculating section 43 corresponds to a servo calculating section (means), in a broad sense of term. It is also noted that target rear road wheel steering angle $\delta^*$ recited in equation (2) has the same meaning as rear road wheel steering angle command value $\delta^*$ recited in rear road wheel steering command value calculating section 42 and rear road wheel steering angle servo calculating section 43.

The entire contents of a Japanese Patent Application No. 2003-031556 (filed in Japan on Feb. 7, 2003) are herein incorporated by reference. The scope of the invention is defined with reference to the following claims.

What is claimed is:

1. A vehicular motion control apparatus, comprising:
   a steering angle detecting section configured to detect a vehicular steering angle;
   a vehicle speed detecting section configured to detect a vehicle speed;
   a vehicular motion control mechanism configured to control a vehicular motion;
   a state detecting section configured to detect a state of the vehicular motion control mechanism;
   a vehicular motion target value calculating section configured to calculate a target value of the vehicular motion on a basis of detection values of the steering angle and the vehicle speed and vehicle speed dependent constants preset in a form of a map for each vehicle speed;
   a control command value calculating section configured to calculate a control command value required for the vehicular motion control mechanism to achieve the target value of the vehicular motion; and
   a servo calculating section configured to provide a control signal for the motion control mechanism in order for a detection value of the state of the vehicular motion control mechanism to be made coincident with the control command value; and
   a vehicle speed variation amount limiter configured to place a limitation on a vehicle speed variation amount by comparing the detected value of the vehicle speed to a vehicle speed variation amount limit value, wherein the vehicle speed variation amount limit value varies in accordance with the detection value of the vehicular steering angle,
   wherein the vehicular motion target value calculating section is configured to determine a map reference vehicle speed on the basis of an output of the vehicle speed variation amount limiter.

2. A vehicular motion control apparatus as claimed in claim 1, wherein the vehicle speed variation amount limiter includes a setting section configured to increase the vehicle speed variation amount limit value as an absolute value of the detection value of the steering angle decreases.

3. A vehicular motion control apparatus as claimed in claim 1, wherein the vehicular motion control mechanism comprises a rear road wheel steering angle providing section configured to provide a rear road wheel steering angle for the vehicle, the state detecting section comprises a rear road wheel steering angle detecting section configured to detect the rear road wheel steering angle, the control command value calculating section comprises a rear road wheel steering angular command value calculating section configured to calculate a control command value required for the rear road wheel steering angle providing section to achieve the vehicular motion target value,
   wherein the rear road wheel steering angular command value calculating section is configured to calculate control command values that approach zero when the detection value of the vehicle speed is lower than a preset vehicle speed, irrespective of a result of calculation of the rear road wheel steering angle command value required to achieve the vehicular motion target value.

4. A vehicular motion control apparatus as claimed in claim 3, wherein the vehicular motion target value calculating section comprises a vehicular motion target value setting section configured to calculate a target yaw rate ($\Psi'^*$) and a target yaw angular acceleration ($\Psi''^*$) on the basis of the detection values of a front road wheel steering angle detecting section and of the vehicle speed detecting section,
   wherein the rear road wheel steering angular command value calculating section is configured to calculate a target rear road wheel steering angle ($\delta^*$) on the basis of the target yaw rate ($\Psi'^*$), target yaw angular acceleration ($\Psi''^*$), detection values of front road wheel steering angle ($\theta$) and the vehicle speed (V),
   wherein the servo calculating section comprises a rear road wheel steering angle servo calculating section configured to output the control signal to a rear road wheel steering actuator in order for the rear road wheel steering angle ($\delta$) detected by the rear road wheel steering angle detecting section to be made coincident with the target value of the rear road wheel steering angle ($\delta^*$).

5. A vehicular motion control apparatus as claimed in claim 4, wherein the vehicular motion target value setting section is configured to calculate the target yaw rate ($\Psi'^*$) to the front road wheel steering angle ($\theta$) on the basis of a predetermined transfer function ($\Psi'^*/\theta$) between the front road wheel steering angle ($\theta$) and the target yaw rate ($\Psi'^*$), wherein the predetermined transfer function includes a plurality of vehicle speed dependent constants which are preset with predetermined characteristics on the basis of the map reference vehicle speed (Vmap).

6. A vehicular motion control apparatus as claimed in claim 5, wherein the rear road wheel steering angular command value calculating section is configured to calculate the target rear road wheel steering angle ($\delta^*$) such that an actual yaw rate is coincident with the target yaw rate ($\Psi'^*$),
   wherein the rear road wheel steering angular command value calculating section calculates the target rear road wheel steering angle ($\delta^*$) on the basis of the target yaw rate ($\Psi'^*$), the target yaw angular acceleration ($\Psi''^*$), the detection value of the front road wheel steering angle ($\theta$), and the map reference vehicle speed (Vmap).

7. A vehicular motion control apparatus as claimed in claim 6, wherein the vehicle speed variation amount limiter comprises:
   a vehicle speed variation amount limit value setting section configured to set a vehicle speed variation amount limit value (dVlimit) in accordance with an absolute value of the steering angle ($|\theta|$) detected by the front road wheel steering angle detecting section;
   a first map reference vehicle speed comparing section configured to compare a present detection value (V(n)) of the vehicle speed with a previous map reference vehicle speed (Vmap(n−1)) from a previous predetermined control period to determine whether the present detection value of the vehicle speed (V(n)) is equal to, larger than, or smaller than the previous map reference vehicle speed (Vmap(n−1));

a second map reference value comparing section configured to compare a first difference between the present value of the vehicle speed (V(n)) and the previous map reference vehicle speed (V(n)−Vmap(n−1)) and determine if the first difference is larger than the vehicle speed variation amount limit value (dVlimit) when the first map reference vehicle speed comparing section determines that the present detection value of the vehicle speed (V(n)) is greater than the previous map reference vehicle speed (Vmap(n−1));

a third map reference vehicle speed comparing section configured to compare a second difference between the previous map reference vehicle speed (Vmap(n−1)) and the present detection value of the vehicle speed (Vmap(n−1)−V(n)) and determine if the second difference is larger than the vehicle speed variation amount limit value (dVlimit) when the first map reference vehicle speed comparing section determines that the present value of the vehicle speed (V(n)) is smaller than the previous value of the map reference vehicle speed (Vmap(n−1));

a first map reference vehicle speed setting section configured to set a present map reference vehicle speed (Vmap(n)) to be equal to a sum of the previous detection value of the map reference vehicle speed and the vehicle speed variation amount limit value (dVlimit) (Vmap(n)=Vmap(n−1)+dVlimit) when the second map reference value comparing section determines that the difference between the present value of the detection value of the vehicle speed (V(n)) and the previous map reference vehicle speed (Vmap(n−1)) is larger than the vehicle speed variation amount limit value (dVlimit);

a second map reference vehicle speed setting section configured to set the present value of the map reference vehicle speed (Vmap(n)) to be equal to the present detection value of the vehicle speed (V(n)) when the first map reference vehicle speed comparing section determines that the present value of the detection value of the vehicle speed (V(n)) is equal to the previous map reference vehicle speed (Vmap(n−1)), when the second map reference value comparing section determines that the first difference (V(n)−Vmap(n−1)) is equal to or smaller than the vehicle speed variation amount limit value (dVlimit), and when the third map reference vehicle speed comparing section determines that the second difference is equal to or smaller than the vehicle speed variation amount limit value (dVlimit); and a third map reference vehicle speed setting section configured to set the present value of the map reference vehicle speed (Vmap(n)) to a subtraction of the vehicle speed variation amount limit value (dVlimit) from the previous value of the map reference vehicle speed (Vmap(n−1)) when the third map reference vehicle speed comparing section determines that the first difference (V(n)−Vmap(n−1)) is larger than the vehicle speed variation amount limit value (dVlimit).

8. A vehicular motion control apparatus as claimed in claim 7, wherein the vehicle speed dependent constants (GΨ, ωn, ζ, n₁) are determined in accordance with the present value of the map reference vehicle speed (Vmap(n)) set by any one of the first, second, and third map reference vehicle speed setting sections.

9. A vehicular motion control apparatus as claimed in claim 6, wherein the rear road wheel steering angular command value calculating section comprises:

a vehicle speed region determining section configured to determine whether the detection value of the vehicle speed is lower than a predetermined vehicle speed (B);

a first rear road wheel steering angle command value comparing section configured to compare an absolute value of a previous value of a rear road wheel steering angle control command value (|δ*(n−1)|) from a previous predetermined control period with a rear road wheel steering angle control command value convergence quantity (α) to determine whether the absolute value of the previous value of the rear road wheel steering angle control command value (|δ*(n−1)|) is larger than the rear road wheel steering angle control command value convergence quantity (α) when the detection value of the vehicle speed (V) is lower than the predetermined vehicle speed (B);

a first rear road wheel steering angle command value setting section configured to set a present value of a rear road wheel steering angle control command value δ*(n) to zero when the absolute value of the previous value of the rear road wheel steering angle control command value (|δ*(n−1)|) is equal to or lower than the rear road wheel steering angle control command value convergence quantity (α) (|δ*(n−1)|≦α);

a second rear road wheel steering angle command value comparing section configured to compare the previous value of the rear road wheel steering angle control command value (δ*(n−1)) with zero when the absolute value of the previous value of the rear road wheel steering angle control command value (|δ*(n−1)|) is larger than the rear road wheel steering angle control command value convergence quantity (α) (|δ*(n−1)|>α);

a second rear road wheel steering angle command value setting section configured to set the present value of the rear road wheel steering angle control command value (δ*(n)) as a subtraction of the rear road wheel steering angle control command value convergence quantity from the previous value of the rear road wheel steering angle control command value (δ*(n)=δ*(n−1)−α), when the second rear road wheel steering angle command value comparing section determines that the previous value of the rear road wheel steering angle control command value (δ*(n−1)) is larger than zero; and a third rear road wheel steering angle command value setting section configured to set the present value of the rear road wheel steering angle control command value (δ*(n)) as a sum of the previous value of the rear road wheel steering angle control command value and the rear road wheel steering angle control command value convergence quantity (δ*(n)=δ*(n−1)+α), when the second rear road wheel steering angle command value comparing section determines that the previous value of the rear road wheel steering angle control command value (δ*(n−1)) is equal to or smaller than zero.

10. A vehicular motion control apparatus as claimed in claim 9, wherein the rear road wheel steering angle control command value convergence quantity (α) is a set value of a speed at which the absolute value of the rear road wheel steering angle control command value (|δ*(n)|) approaches zero.

11. A vehicular motion control apparatus as claimed in claim 1, wherein the control command value calculating section is configured to calculate the control command value on the basis of the map reference vehicle speed.

12. A vehicular motion control apparatus, comprising:
steering angle detecting means for detecting a vehicular steering angle;
vehicle speed detecting means for detecting a vehicle speed;
vehicular motion controlling means for controlling a vehicular motion;
state detecting means for detecting a state of the vehicular motion controlling means;
vehicular target value calculating means for calculating a target value of the vehicular motion on the basis of detection values of the steering angle and the vehicle speed and vehicle speed dependent constants preset in a form of a map for each vehicle speed;
control command value calculating means for calculating a control command value required for the vehicular motion controlling means to achieve the target value of the vehicular motion; and
servo calculating means for providing a control signal for the vehicular motion controlling means in order for a detection value of the state of the vehicular motion controlling means to be made coincident with the control command value; and
vehicle speed variation amount limiting means configured to place a limitation on a vehicle speed variation amount by comparing the detected value of the vehicle speed to a vehicle speed variation amount limit value, wherein the vehicle speed variation amount limit value varies in accordance with the detection value of the vehicular steering angle,
wherein the vehicular target value calculating means is configured to determine a map reference vehicle speed on the basis of an output of the vehicle speed variation amount limiting means.

13. A vehicular motion control apparatus, comprising:
a steering angle sensor configured to detect a vehicular steering angle;
a vehicle speed sensor configured to detect a vehicle speed;
a road wheel steering mechanism;
a road wheel steering angle sensor configured to detect an angle that a road wheel is turned; and
a controller, wherein the controller comprises:
  a vehicular motion target value calculating section configured to calculate a target value of a vehicular motion on the basis of the detected steering angle, the detected vehicle speed, and constants that are determined from a map on the basis of vehicle speed;
  a road wheel steering angle command value calculating section configured to calculate a control command value, wherein the control command value is calculated for the road wheel steering mechanism to achieve the target value of vehicular motion;
  a road wheel steering angle servo calculating section configured to provide a control signal for the road wheel steering mechanism;
wherein the controller is configured to compare the detected vehicle speed to a vehicle speed variation amount limit value to limit variation in detected vehicle speed, wherein the vehicle speed variation amount limit value varies with the detected steering angle;
wherein the controller is configured to calculate a map reference vehicle speed on the basis of the comparison between the detected vehicle speed and the vehicle speed variation amount limit value.

14. The vehicular motion control apparatus as claimed in claim 13, wherein the constants are determined on the basis of the map reference vehicle speed.

15. The vehicular motion control apparatus as claimed in claim 13, wherein the target value of a vehicular motion comprises a target yaw rate and a target yaw angular acceleration,
wherein the vehicular motion target value calculating section is configured to calculate the target yaw rate and the target yaw angular acceleration on the basis of the detected steering angle, the detected vehicle speed, and the constants,
wherein the control command value for the road wheel steering mechanism to achieve the target value of vehicular motion comprises a target wheel steering angle,
wherein the road wheel steering angle command value calculating section is configured to calculate the target wheel steering angle on the basis of the target yaw rate, the target yaw angular acceleration, the detected steering angle, and vehicle speed,
wherein the road wheel steering angle servo calculating section is configured to calculate the control signal such that the detected road wheel angle is coincident with the target wheel steering angle.

16. The vehicular motion control apparatus as claimed in claim 15, wherein the controller is configured to calculate the map reference vehicle speed by determining if a difference between a present detected vehicle speed value and a previous map reference vehicle speed from a previous predetermined control period is greater than a vehicle speed variation amount limit value.

17. The vehicular motion control apparatus as claimed in claim 15, wherein the controller further comprises:
a vehicle speed variation amount limit value setting section configured to set a vehicle speed variation amount limit value (dVlimit) in accordance with an absolute value of the steering angle ($|\theta|$) detected by a front road wheel steering angle detecting section;
a first map reference vehicle speed comparing section configured to compare a present detection value (V(n)) of the vehicle speed with a previous map reference vehicle speed (Vmap(n−1)) from a previous predetermined control period to determine whether the present detection value of the vehicle speed (V(n)) is equal to, larger than, or smaller than the previous map reference vehicle speed (Vmap(n−1));
a second map reference value comparing section configured to compare a first difference between the present value of the vehicle speed (V(n)) and the previous map reference vehicle speed (V(n)−Vmap(n−1)) and determine if the first difference is larger than the vehicle speed variation amount limit value (dVlimit) when the first map reference vehicle speed comparing section determines that the present detection value of the vehicle speed (V(n)) is greater than the previous map reference vehicle speed (Vmap(n−1));
a third map reference vehicle speed comparing section configured to compare a second difference between the previous map reference vehicle speed (Vmap(n−1)) and the present detection value of the vehicle speed (Vmap(n−1)−V(n)) and determine if the second difference is larger than the vehicle speed variation amount limit value (dVlimit) when the first map reference vehicle speed comparing section determines that the present value of the vehicle speed (V(n)) is smaller than the previous value of the map reference vehicle speed (Vmap(n−1));

a first map reference vehicle speed setting section configured to set a present map reference vehicle speed (Vmap(n)) of the previous detection value of the map reference vehicle speed and the vehicle speed variation amount limit value (dVlimit) (Vmap(n)=Vmap(n−1)+dVlimit) when the second map reference value comparing section determines that the difference between the present value of the detection value of the vehicle speed (V(n)) and the previous map reference vehicle speed (Vmap(n−1)) is larger than the vehicle speed variation amount limit value (dVlimit);

a second map reference vehicle speed setting section configured to set the present value of the map reference vehicle speed (Vmap(n)) to be equal to the present detection value of the vehicle speed (V(n)) when the first map reference vehicle speed comparing section determines that the present value of the detection value of the vehicle speed V(n) is equal to the previous map reference vehicle speed (Vmap(n−1)), when the second map reference value comparing section determines that the first difference (V(n)−Vmap(n−1)) is equal to or smaller than the vehicle speed variation amount limit value (dVlimit), and when the third map reference vehicle speed comparing section determines that the second difference is equal to or smaller than the vehicle speed variation amount limit value (dVlimit); and a third map reference vehicle speed setting section configured to set the present value of the map reference vehicle speed (Vmap(n)) to a subtraction of the vehicle speed variation amount limit value (dVlimit) from the previous value of the map reference vehicle speed (Vmap(n−1)) when the third map reference vehicle speed comparing section determines that the first difference (V(n)−Vmap(n−1)) is larger than the vehicle speed variation amount limit value (dVlimit).

18. The vehicular motion control apparatus as claimed in claim 15, wherein the controller is configured to calculate the target wheel steering angle by comparing an absolute value of a previous value of a rear road wheel steering angle control command value (|δ*(n−1)|) from a previous predetermined control period with a rear road wheel steering angle control command value convergence quantity.

19. A vehicular motion control apparatus as claimed in claim 15, further comprising a rear road wheel steering angle command value calculating section which comprises:

a vehicle speed region determining section configured to determine whether the detection value of the vehicle speed is lower than a predetermined vehicle speed (B);

a first rear road wheel steering angle command value comparing section configured to compare an absolute value of a previous value of a rear road wheel steering angle control command value (|δ*(n−1)|) from a previous predetermined control period with a rear road wheel steering angle control command value convergence quantity (α) to determine whether the absolute value of the previous value of the rear road wheel steering angle control command value (|δ*(n−1)|) is larger than the rear road wheel steering angle control command value convergence quantity (α) when the detection value of the vehicle speed (V) is lower than the predetermined vehicle speed (B);

a first rear road wheel steering angle command value setting section configured to set a present value of the rear road wheel steering angle command value (δ*(n)) to zero when the absolute value of the previous value of the rear road wheel steering angle control command value (|δ*(n−1)|) is equal to or lower than the rear road wheel steering angle control command value convergence quantity (α) (|δ*(n−1)|≦α);

a second rear road wheel steering angle command value comparing section configured to compare the previous value of the rear road wheel steering angle control command value (δ*(n−1)) with zero when the absolute value of the previous value of the rear road wheel steering angle control command value (|δ*(n−1)|) is larger than the rear road wheel steering angle control command value convergence quantity (α) (|δ*(n−1)|>α);

a second rear road wheel steering angle command value setting section configured to set the present value of the rear road wheel steering angle control command value (δ*(n)) as a subtraction of the rear road wheel steering angle control command value convergence quantity from the previous value of the rear road wheel steering angle control command value (δ*(n)=δ*(n−1)−α), when the second rear road wheel steering angle command value comparing section determines that the previous value of the rear road wheel steering angle control command value (δ*(n−1)) is larger than zero; and a third rear road wheel steering angle command value setting section configured to set the present value of the rear road wheel steering angle control command value (δ*(n)) as a sum of the previous value of the rear road wheel steering angle control command value and the rear road wheel steering angle control command value convergence quantity (δ*(n)=δ*(n−1)+α), when the second rear road wheel steering angle command value comparing section determines that the previous value of the rear road wheel steering angle control command value (δ*(n−1)) is equal to or smaller than zero.

20. A vehicular motion control apparatus as claimed in claim 13, wherein the road wheel steering angle command value calculating section is configured to calculate the control command value on the basis of the map reference vehicle speed.

* * * * *